W. V. TURNER.
LIMITING VALVE DEVICE.
APPLICATION FILED SEPT. 3, 1913.
1,099,582.
Patented June 9, 1914.
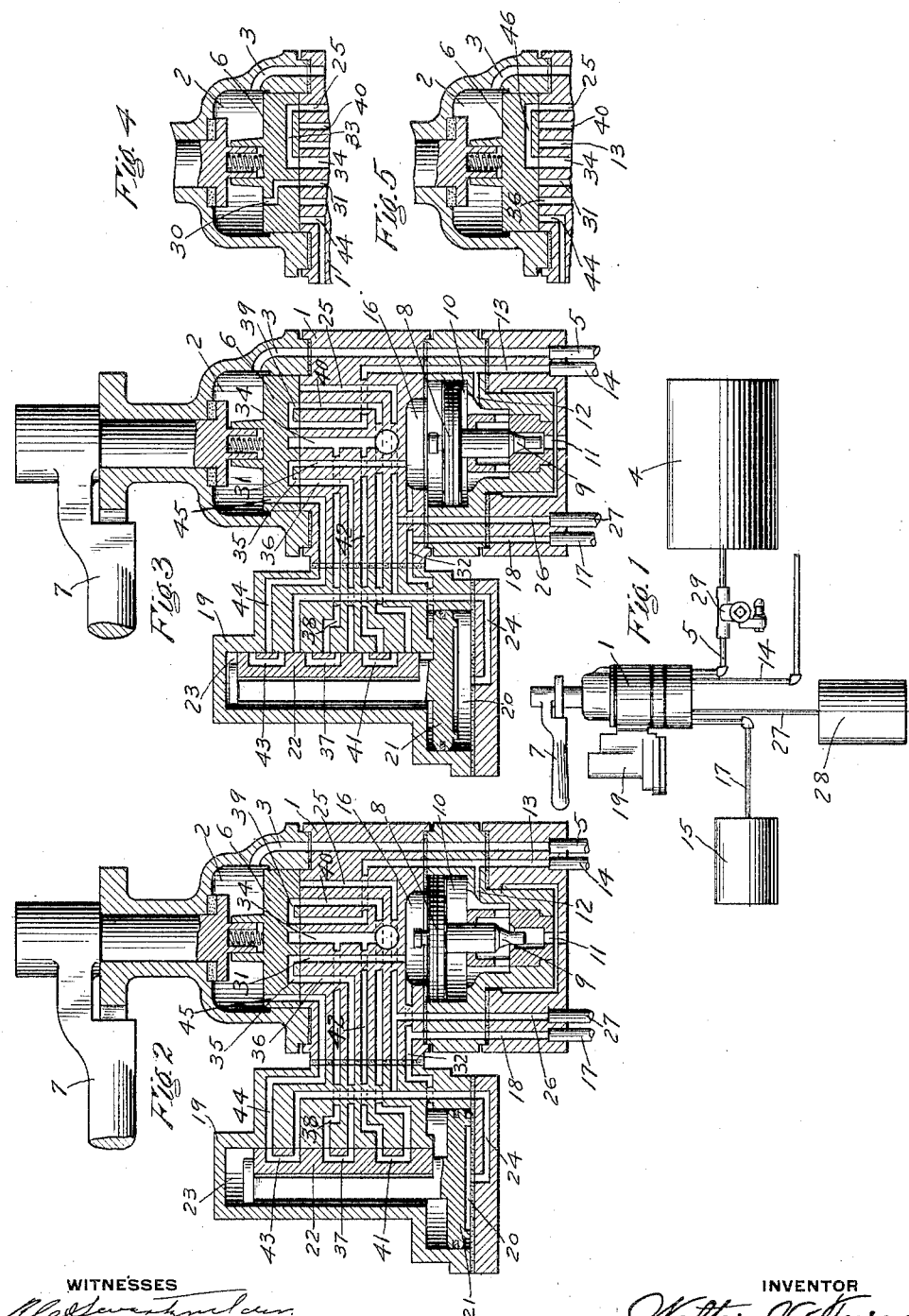
WITNESSES
INVENTOR
Walter V. Turner
by Wm. H. Cady
Atty.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LIMITING VALVE DEVICE.

1,099,582. Specification of Letters Patent. Patented June 9, 1914.

Application filed September 3, 1913. Serial No. 787,927.

*To all whom it may concern:*

Be it known that I, WALTER V. TURNER, a citizen of the United States, residing at Edgewood, in the county of Allegheny and State of Pennsylvania, have invented new and useful Improvements in Limiting Valve Devices, of which the following is a specification.

This invention relates to fluid pressure brakes, and more particularly to means for limiting to a predetermined degree, the reduction in train pipe pressure which may be made by manipulation of the brake valve.

In my prior Patent No. 1,039,222, granted September 24, 1912, a valve device for accomplishing the above purpose is disclosed and comprises a piston subject to the opposing pressures of the usual equalizing reservoir and a limiting reservoir, normally at atmospheric pressure. The piston operates a valve for controlling the exhaust of fluid from the equalizing reservoir and in service application position of the brake valve, fluid under pressure is supplied to the limiting reservoir. The limiting valve device has no influence on the operation until the equalizing reservoir pressure has been reduced to the equalizing point and the pressure in the limiting reservoir has been increased to a point slightly exceeding the reduced equalizing reservoir pressure and sufficient to move the limiting piston and valve so as to close the exhaust from the equalizing reservoir. If after the limiting valve device has moved to the closed position, the brake valve should be allowed to remain in service application position, the pressure in the limiting reservoir will continue to increase up to the degree of pressure carried in the system. Ordinarily this would do no harm as the excessive pressure in the limiting reservoir would be released in the release position of the brake valve, but if for any reason, a second brake application is desired and the brake valve handle should be operated to effect a reduction in train pipe pressure, it will be seen that the limiting valve parts cannot move to the normal open position until this excessive pressure in the limiting reservoir has been released or until the equalizing reservoir pressure preponderates. This causes delay in securing an application of the brakes which might be undesirable at times.

The principal object of my invention is to obviate the above difficulty and for this purpose means are provided for limiting the increase in limiting reservoir pressure to the degree required for operating the limiting valve device.

In the accompanying drawing; Figure 1 is a diagrammatic view of a brake valve device connected up to the various reservoirs and the train pipe and embodying my improvement; Fig. 2 a central sectional view of the brake valve device with the improved limiting valve device applied, showing the parts in the positions assumed upon movement of the brake valve handle to service application position; Fig. 3 a similar view, showing the parts in the positions assumed after equalization; Fig. 4 a fragmentary sectional view of the brake valve in release position; and Fig. 5 a similar view, with the rotary valve in emergency application position.

The brake valve proper may comprise the usual casing 1 having a valve chamber 2 connected to passage 3 which communicates with the main reservoir 4 through pipe 5 and feed valve 29 and contains rotary valve 6 adapted to be operated by brake valve handle 7.

Equalizing discharge valve piston 8 operates discharge valve 9 to vent fluid from chamber 10, at one side of the piston, to exhaust port 11, said chamber being connected by passages 12 and 13 to train pipe 14. Equalizing reservoir 15 communicates with chamber 16 at the opposite side of the equalizing piston 8 through pipe 17 and passage 18.

The limiting valve device may comprise a casing 19 secured to the brake valve casing 1 and having a piston chamber 20 containing a piston 21 for operating a slide valve 22 contained in valve chamber 23. A passage 24 leads from the piston chamber 20 to the seat of slide valve 22 and also communicates with a passage 25 leading to the seat of rotary valve 6 and open to passage 26 connected with pipe 27 leading to the limiting reservoir 28.

In the release position of the brake valve, as shown in Fig. 4 of the drawing, port 30 in the rotary valve 6 registers with passage 31 leading to the equalizing piston chamber 16, so that the equalizing reservoir is charged to the normal pressure carried in the system and fluid at equalizing reservoir pressure is also supplied from passage 18 through passage 32 to valve chamber 23. Equalizing reservoir pressure in valve chamber 23 shifts the limiting valve piston to the position shown in Fig. 2, and as passage 24 leading to piston chamber 20 is connected through passage 25 and cavity 33 in the rotary valve 6 with exhaust port 34, the limiting valve piston 21 is normally maintained in this position.

If the brake valve handle 7 is moved to service application position, as shown in Fig. 2 of the drawing, the equalizing reservoir chamber 16 is connected to the exhaust port 34 through passage 31, cavity 35 in the rotary valve 6, passage 36, cavity 37 in the limiting slide valve 22, and passage 38, so that fluid is vented from the equalizing reservoir to cause the operation of the equalizing discharge valve in the usual manner. Fluid is also vented directly from the train pipe through passage 13, cavity 39 in the rotary valve 6, passage 40, cavity 41 in the limiting valve 22, and passage 42 to the exhaust port 34.

In the normal position of the limiting valve device, as shown in Fig. 2, passage 24 is connected to the rotary valve chamber 2 through cavity 43 in the limiting valve 22, passage 44, and port 45 in the rotary valve, so that fluid is supplied to piston chamber 20 of the limiting valve piston 21. The communication through which fluid is supplied to said piston chamber is preferably of such capacity that the piston chamber and the limiting reservoir 28 are charged to the desired degree of pressure at which the train pipe pressure is limited to reduce to, in substantially the same time that is required to reduce the equalizing reservoir pressure to the same limiting degree of pressure. For example, if the normal train pipe pressure is seventy pounds and the pressure at which the train pipe is limited to reduce to is fifty pounds, then the communication through which the limiting reservoir is charged is made of such size that the limiting reservoir volume is charged from zero to fifty pounds in the same time as is required to reduce the equalizing reservoir pressure from seventy to fifty pounds.

If the brake valve handle should be left in service application position, the pressure in the equalizing reservoir will continue to reduce until the pressure in piston chamber 20 has increased to a point slightly exceeding the reduced equalizing reservoir pressure and sufficient to shift the limiting valve piston 21 to the closed position, as shown in Fig. 3. The movement of the limiting slide valve 22 to this position cuts off the escape of fluid from the equalizing reservoir and directly from the train pipe and also closes communication from the supply port 45 to the passage 24 and the piston chamber 20.

It will now be evident that as the charging port for the piston chamber 20 is cut off at the same time that the venting of fluid from the equalizing reservoir is cut off, further increase in pressure in said piston chamber is prevented.

As the limiting reservoir pressure is thus but slightly in excess of the equalizing reservoir pressure, when the brake valve handle is moved to release position, the limiting valve piston is promptly shifted to normal position, even where the brake valve handle is moved quickly from service lap position to release position and then back to lap position in the operation of graduating the release of the brakes. Consequently, if it should be desired to immediately re-apply the brakes, the limiting valve parts will move promptly to normal position, so that the desired service reduction can be obtained without delay.

In emergency application position of the brake valve, as shown in Fig. 5 of the drawing, a cavity 46 in the rotary valve 6 connects the passage 25 with exhaust port 34, so that the limiting valve piston chamber 20 is maintained at atmospheric pressure and the limiting valve piston thus prevented from moving. The limiting valve device is thus cut out of action in an emergency application, so that the train pipe pressure may be reduced to any extent desired.

Having now described my invention, what I claim as new and desire to secure by Letters Patent, is:—

1. In a fluid pressure brake, the combination with a train pipe and a valve device operated by an increase in fluid pressure for limiting the reduction in train pipe pressure to a predetermined degree, of means for limiting said increase in fluid pressure.

2. In a fluid pressure brake, the combination with a train pipe and a valve device operated by an increase in fluid pressure for limiting the reduction in train pipe pressure to a predetermined degree, of means for limiting said increase in fluid pressure to a degree sufficient to operate said valve device.

3. In a fluid pressure brake, the combination with a train pipe and a valve device operated upon an increase in fluid pressure for limiting the reduction in train pipe pressure to a predetermined degree, of means controlled by said valve device for preventing an increase in fluid pressure on said valve device above the degree required to operate the valve device.

4. In a fluid pressure brake, the combination with a train pipe, a brake valve for effecting a reduction in train pipe pressure, and a valve device operated upon an increase in fluid pressure for limiting the reduction in train pipe pressure to a predetermined degree, of means controlled by said valve device for cutting off the flow of fluid to said valve device upon movement thereof to limit the reduction in train pipe pressure.

5. In a fluid pressure brake, the combination with a train pipe, a brake valve having an equalizing discharge valve device operated by a reduction in pressure in the equalizing reservoir for effecting a reduction in train pipe pressure, and a valve device subject on one side to equalizing reservoir pressure and operated by an increase in fluid pressure on the opposite side for closing communication through which fluid is vented from the equalizing reservoir, of means adapted upon closing said communication to prevent further increase in fluid pressure on said valve device.

6. In a fluid pressure brake, the combination with a train pipe, a brake valve having an equalizing discharge valve device operated by a reduction in pressure in the equalizing reservoir for effecting a reduction in train pipe pressure, and a valve device subject on one side to equalizing reservoir pressure and operated by an increase in fluid pressure on the opposite side for closing communication through which fluid is vented from the equalizing reservoir, of means controlled by said valve device for cutting off the flow of fluid under pressure for increasing the fluid pressure on said valve device upon movement of said valve device to close said communication.

7. In a fluid pressure brake, the combination with a train pipe, a brake valve having an equalizing discharge valve device operated by a reduction in pressure in the equalizing reservoir for effecting a reduction in train pipe pressure, and a valve device subject on one side to equalizing reservoir pressure and operated by an increase in fluid pressure on the opposite side for closing communication through which fluid is vented from the equalizing reservoir, of means controlled by said valve device for normally establishing a communication through which fluid is supplied to operate said valve device, said communication being closed by the movement of said valve device to close the communication for venting fluid from the equalizing reservoir.

8. In a fluid pressure brake, the combination with a train pipe and a brake valve device having a direct and a preliminary exhaust port for effecting a reduction in train pipe pressure, of a limiting valve device separately controlling said direct and preliminary exhaust ports for limiting the reduction in train pipe pressure to a predetermined degree.

In testimony whereof I have hereunto set my hand.

WALTER V. TURNER.

Witnesses:
A. M. CLEMENTS,
B. A. OLIVER.

Copies of this patent may be obtained for five cents each, by addressing the "Commissioner of Patents, Washington, D. C."